United States Patent

[11] 3,597,012

| [72] | Inventors | Mervyn B. Packer;<br>Gordon W. Judge, both of Leamington Spa, England |
|---|---|---|
| [21] | Appl. No. | 820,917 |
| [22] | Filed | May 1, 1969 |
| [45] | Patented | Aug. 3, 1971 |
| [73] | Assignee | Automotive Products Company Limited<br>Leamington Spa, England |
| [32] | Priority | May 2, 1968 |
| [33] | | Great Britain |
| [31] | | 20,774/68 |

[54] LIQUID PRESSURE BRAKING SYSTEMS FOR VEHICLES
4 Claims, 6 Drawing Figs.

[52] U.S. Cl. .................................................. 303/21 F,
188/181 A, 303/61
[51] Int. Cl. .................................................. B60t 8/02
[50] Field of Search .......................................... 303/21, 6,
68—69, 61—63; 188/181

[56] References Cited
UNITED STATES PATENTS

| 3,312,509 | 4/1967 | Highley | 303/21 |
| 3,467,441 | 9/1969 | Clark et al. | 303/21 |
| 3,260,556 | 7/1966 | Packer | 303/21 |
| 3,401,986 | 9/1968 | Walker et al. | 303/21 |
| 3,415,578 | 12/1968 | Walker | 303/21 |

*Primary Examiner*—Milton Buchler
*Assistant Examiner*—John J. McLaughlin
*Attorney*—Lawrence J. Winter ABSTRACT: A liquid pressure braking system for a vehicle in which a valve normally open to connect motor cylinders operating brakes to a source of liquid pressure, and a plunger movable to vary the volume of the part of the system between the said valve and the motor cylinders, are normally held in positions such that the valve is open and the said volume is a minimum by a fluid pressure servodevice having a movable wall, a skid-sensing device controlling valve means which cause simultaneous changes of fluid pressure on both sides of the movable wall to reverse rapidly the pressure differential across the movable wall and cause rapid closing of the normally open valve and movement of the plunger to increase the volume of the said part of the system when a tendency to skid is sensed.

LIQUID PRESSURE BRAKING SYSTEMS FOR VEHICLES

This invention relates to liquid pressure braking systems for vehicles of the kind in which means are provided to reduce automatically the liquid pressure exerted to apply the brake or brakes acting to resist rotation of a wheel or wheels of the vehicle as a result of a tendency of the said wheel or wheels to skid or to approach conditions in which skidding would commence, so that the braking can be relieved to prevent prolonged wheel locking and resultant sliding of the vehicle.

To achieve the desired automatic reduction of liquid pressure exerted to apply the brake or brakes without reducing the pressure generated in a master cylinder or other pressure source from which the braking pressure is derived, a valve is provided which is normally held open, and acts, when closed, as a one-way valve preventing flow of liquid from the pressure source to the motor cylinder or cylinders actuating the brake or brakes. Associated with the valve is a plunger which can move to vary the volume of the liquid space between the valve and the motor cylinder or motor cylinders and, by increasing the volume of the said space when the valve is closed, can reduce the pressure in that space.

The closing of the valve, and the movement of the plunger to increase the volume of the liquid space between the valve and the motor cylinder or cylinders are caused by a sensing device which may be responsive to vehicle deceleration, wheel slip, wheel locking, or wheel deceleration and will hereinafter be referred to as a skid-sensing device. A movable wall, usually a piston or diaphragm, acted on by opposing forces, determines the positions of the valve and plunger, the said forces, under normal conditions, providing a resultant force which holds the valve open and holds the plunger in a position such that the volume of the liquid space is a minimum, but one or more of the said forces is modified by means controlled by the skid-sensing device when the braking performance does not conform within set limits, to a predetermined value to reverse the direction of the resultant force and close the valve, at the same time allowing the plunger to move and increase the volume of the liquid space.

The piston or diaphragm is subjected, under normal conditions, to a biassing load acting in a direction to hold the valve open and resist movement of the plunger by liquid pressure in the braking system, such biassing load being provided by a spring or by fluid pressure acting on one side of the piston or diaphragm, or by both. The other side of the piston or diaphragm is normally connected to a source of vacuum or to a source of fluid pressure at a value not exceeding that acting in the direction to hold the valve open.

In previously proposed arrangements, the closing of the valve and the movement of the plunger have been effected by varying the fluid pressure acting on only one side of the piston or diaphragm so as to reverse the resultant force on the diaphragm or piston.

Since, in such arrangements, with the pressure change occurring on only one side of the piston or diaphragm, a considerable quantity of air had to be moved into or out of the housing containing the piston or diaphragm to reverse the resultant force and provide a sufficient force in the opposite direction, so that the time interval between the sensing of a skid or slip and the relief of the braking pressure was considerable, as was also the time interval between the sensing of the wheel recovery after release of the brakes and the reapplication of the brakes.

It will be readily apparent that the reduction of both those times is advantageous in that it reduces the risk of prolonged wheel locking due to slow response and, by reducing the time during which the brakes are released, permits stopping of the vehicle, or a desired reduction in its speed, to be effected in a shorter time. It is the object of the present invention to provide a liquid pressure braking system in which a more rapid response to the action of the sensing device is achieved.

According to the present invention, in a liquid pressure braking system for a vehicle including a liquid pressure source, means to reduce automatically the liquid pressure exerted to apply at least one brake acting to resist rotation of at least one wheel of the vehicle, as a result of a tendency of the said wheel to skid or to approach conditions in which skidding would commence, a normally open valve which acts, when closed, as a one-way valve preventing flow of liquid from the pressure source to a motor cylinder acting to apply the said brake to the said wheel, a plunger movable to vary the volume of the liquid space between the said valve and the said motor cylinder, acted upon by the movable wall of a fluid pressure servo device, chambers on opposite sides of said movable wall being normally connected through valve means respectively to sources of higher and lower fluid pressure to maintain a fluid pressure differential across said movable wall in a direction to hold said normally open valve open and oppose movement of the plunger to increase the volume of the said space, the valve means are operated by a skid-sensing device to connect the chamber which is normally connected to the source of higher fluid pressure to a source of lower fluid pressure and to connect the chamber which is normally connected to the source of lower fluid pressure to a source of higher fluid pressure, whereby the pressures in both chambers are changed in opposite directions to reverse rapidly the resultant force acting across the movable wall, thereby closing the normally open valve and allowing the plunger to move in a direction to increase the volume of the space between the said valve and the motor cylinder.

Preferably, means are provided whereby the pressure in at least one of the chambers of the fluid pressure servo device resulting from the action of the sensing device varies with the pressure exerted in the braking system by the liquid pressure source thereof.

Conveniently, each of the chambers of the fluid pressure servo device is connected to a shuttle valve device by means of which it can be placed in communication selectively with a source of relatively higher fluid pressure or a source of relatively lower fluid pressure, the shuttle valve device being controlled in any convenient manner by the sensing device.

The invention is hereinafter described with reference to the accompanying drawings which show, partly diagrammatically, several arrangements of liquid pressure braking systems according to the invention.

Figure 1:
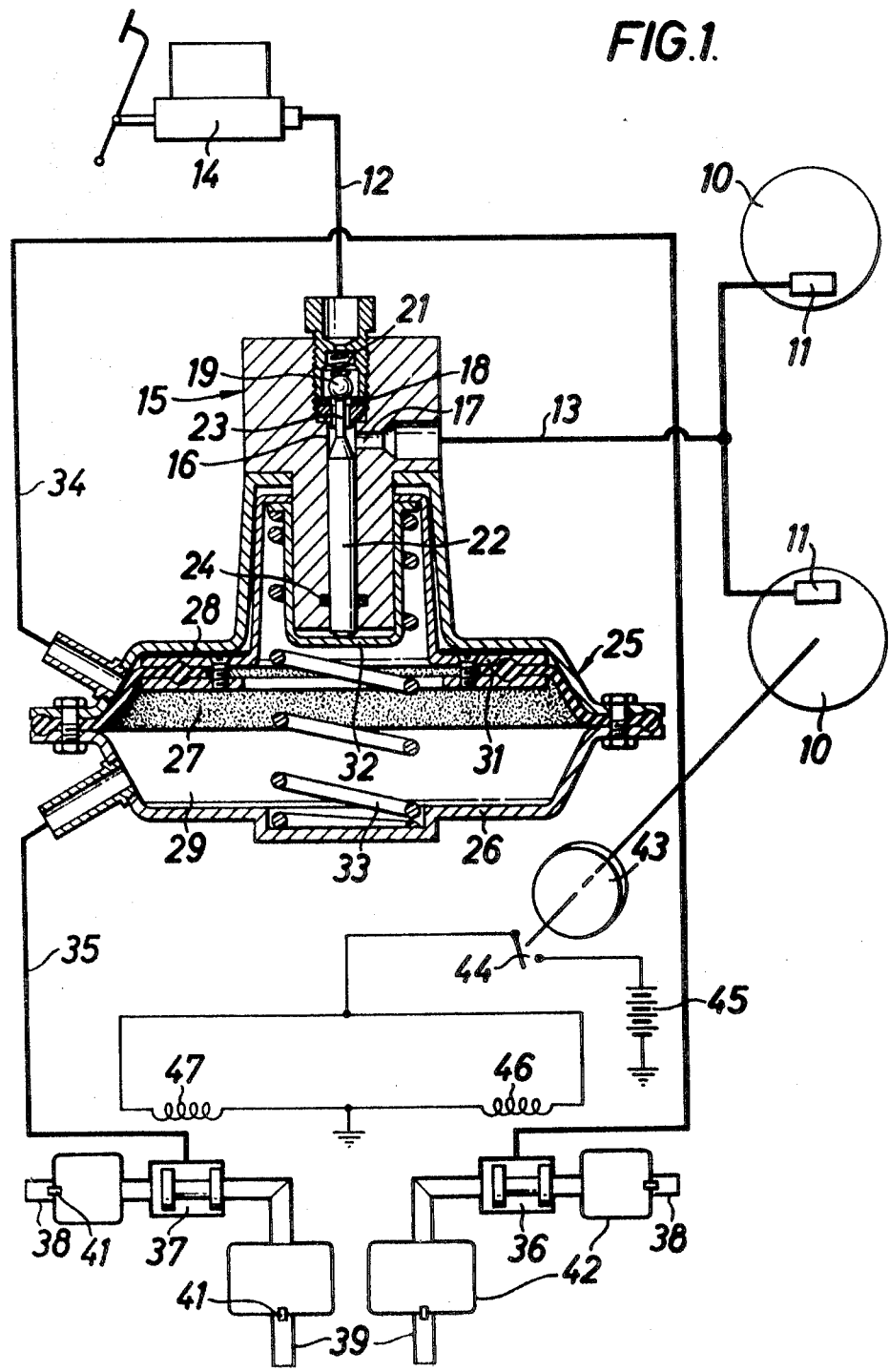
FIG. 1 shows a liquid pressure braking system according to the invention in which two separate shuttle valves are provided.

Referring to FIG. 1 of the drawings, brakes on wheels 10 of a vehicle are actuated by liquid pressure motor cylinders 11 connected by a conduit system 12, 13 to a master cylinder 14, and there is mounted in the said conduit system a housing 15 having a bore 16 one end of which is connected to the master cylinder 14 whilst a lateral passage 17 leading from the bore 16 is connected to the motor cylinders 11. A seat 18 in the said bore 16, between the end thereof to which the master cylinder 14 is connected and the lateral passage 17, is adapted to receive a valve ball 19 to close the said bore, the ball being so positioned as to be urged on to the seat 18 by pressure in the master cylinder 14 and also being urged towards the seat by a spring 21.

A plunger 22 slidable in the bore 16 and fitting closely therein on the side of the lateral passage 17 remote from the master cylinder connection carries a pin 23 of reduced diameter to engage the ball 19 and hold it away from its seat 18. Packing means 24 are provided to ensure a liquidtight joint between the plunger 22 and the bore.

A fluid pressure servo device 25 mounted on the housing comprises a hollow casing 26 divided by a movable wall in the form of a flexible diaphragm 27 into two chambers 28 and 29 and the diaphragm 27 is provided with a stiff center member 31, the plunger 22 engaging a cup-shaped member 32 associated with the center member 31 as will be hereinafter described. For convenience of description, the chamber 28 on the same side of the diaphragm 27 as the plunger will be hereinafter referred to as the first servo chamber, and the chamber 29 on the other side of the diaphragm 27 will be referred to as the second servo chamber. A spring 33 is provided in the second servo chamber 29 to urge the diaphragm in a direction to increase the volume of that chamber and reduce the volume of the first servo chamber 28, the said spring 33 also holding the cup-shaped member 32 in engagement with the center member 31 so that the plunger 22 follows the movements of the diaphragm 27. The first and second servo chambers 28 and 29 are connected respectively by conduits 34 and 35 to shuttle valves 36 and 37 the movable valve member of each of which has two positions. In one of such positions the appropriate servo chamber 28 or 29 is connected to a source of higher pressure, for example, the atmosphere, through a conduit 38 and in the other of those positions that chamber is connected to a source of lower pressure, for example the engine induction manifold through a conduit 39, the connections of each valve to the pressure sources being made through flow restrictors 41 and fixed volume chambers 42 to absorb pressure surges and control the rate of fluid flow and hence diaphragm movement.

The movable members of the two shuttle valves are biassed, for example by springs, not shown, towards positions such that the first servo chamber 28 is normally connected to the lower pressure source through the associated conduit 39 and the second servo chamber 29 is normally connected to the higher pressure source through the associated conduit 38, so that a pressure differential normally exists between the two chambers 28 and 29 which acts to urge the plunger 22 inwardly of the bore 16 in the valve housing, supporting it against liquid pressure in the brake system and holding the valve ball 19 off its seat, so that the brakes can be applied and released in the normal manner.

A sensing device 43, indicated diagrammatically as being driven by one of the wheels 10 and responsive to deceleration of that vehicle wheel, or to wheel slip exceeding a predetermined value, is arranged, when such rate of deceleration or slip is exceeded, to close contacts 44 in an electrical circuit including a source of current 45 and the coils of solenoids 46, 47 associated with the shuttle valves 36 and 37 and energize to said solenoids to reverse the positions of the movable members of both shuttle valves, thus connecting the first servo chamber 28 to the higher pressure source and the second servo chamber 29 to the lower pressure source and rapidly reversing the resultant force on the diaphragm 27. Thus the plunger 22 is moved outwardly of the bore 16 in the valve housing, allowing the valve ball 19 to seat and isolate the motor cylinders 11 from the master cylinder 14, and also increasing the volume of the space between the said valve ball 19 and the motor cylinders 11 to reduce the pressure acting to apply the brakes.

Since pressure changes of opposite sign are produced simultaneously on both sides of the diaphragm 27, the reversal of the resultant force takes place with relatively small flow of air into or out of either servo chamber 28 or 29 and the closing of the valve 19 and reduction of pressure take place rapidly. As a result of the relief of the brake applying pressure the wheels speed up, the sensing device 43 goes out of action, and the shuttle valves 36 and 37 are again reversed, restoring the pressure acting in the brake motor cylinders up to the level at which the predetermined deceleration or wheel slip value is exceeded, the cycle of brake release and reapplication repeating itself so long as the brakes are applied and the wheel adhesion is insufficient to prevent wheel locking. On completion of the skid cycle the plunger 22 returns to the position shown in FIG. 1 and the valve ball 19 is unseated so that normal braking is restored.

Figure 2:
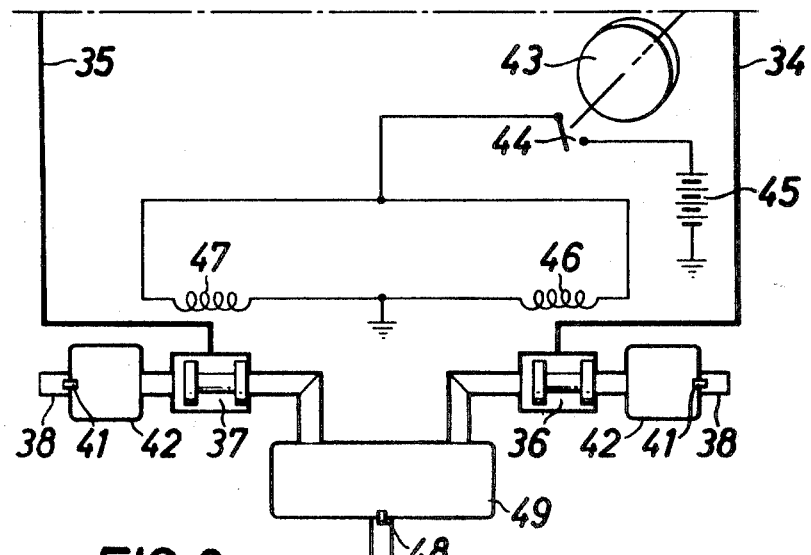
FIG. 2 is a diagram similar to part of FIG. 1, showing a modification.

The two shuttle valves 37 and 38, instead of being connected to a source of higher pressure and to a source of lower pressure each through a separate restrictor and fixed-volume chamber as shown in FIG. 1, may, as shown in FIG. 2, be connected to a source of lower pressure through a common restrictor 48 and fixed-volume chamber 49.

Figure 3:
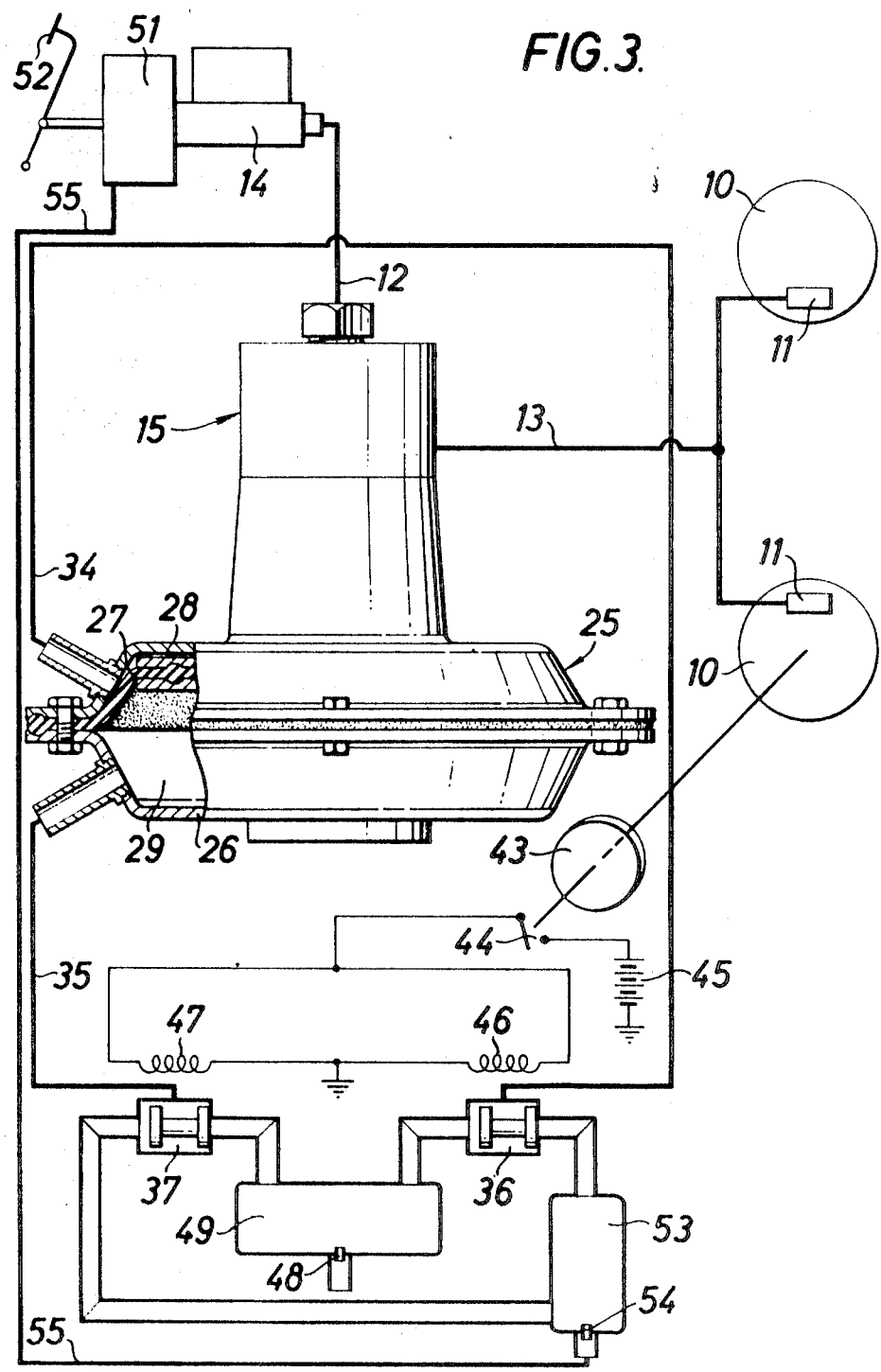
FIG. 3 is a view similar to FIG. 1 showing another modification.

In FIG. 3, in which the valve housing 15 and servo device 25 are identical with those shown in FIG. 1 and are therefore shown only in outline, the master cylinder 14 of the braking system is associated with an air booster 51 of the well-known kind in which a movable wall dividing two chambers which normally contain air at a common pressure, is displaced by admitting air at a higher pressure to one such chamber, to provide the operating thrust on the piston of the master cylinder 14, a valve controlling the air supply to the booster being operated by a pedal 52.

Shuttle valves 36 and 37 corresponding to those shown in FIGS. 1 and 2, and operated in the manner disclosed with reference to FIG. 1 by solenoids 46 and 47 controlled by a sensing device 43, the shuttle valves being connected to a source of vacuum through a common fixed volume chamber 49 and restrictor 48 as shown in FIG. 2.

In the arrangement of FIG. 3, the shuttle valves 36 and 37 are also connected to a common fixed-volume chamber 53 which is connected through a flow restrictor 54 and conduit 55 to the chamber of the booster 51 in which the air pressure is increased when the brakes are to be applied. The pressure exerted in the liquid pressure braking system varies with the pressure in this chamber of the booster, so that the pressure applied to the chamber 28 of the servo device 25 when the skid-sensing device 43 causes the shuttle valves to changeover varies with the liquid pressure in the braking system.

Figure 4:
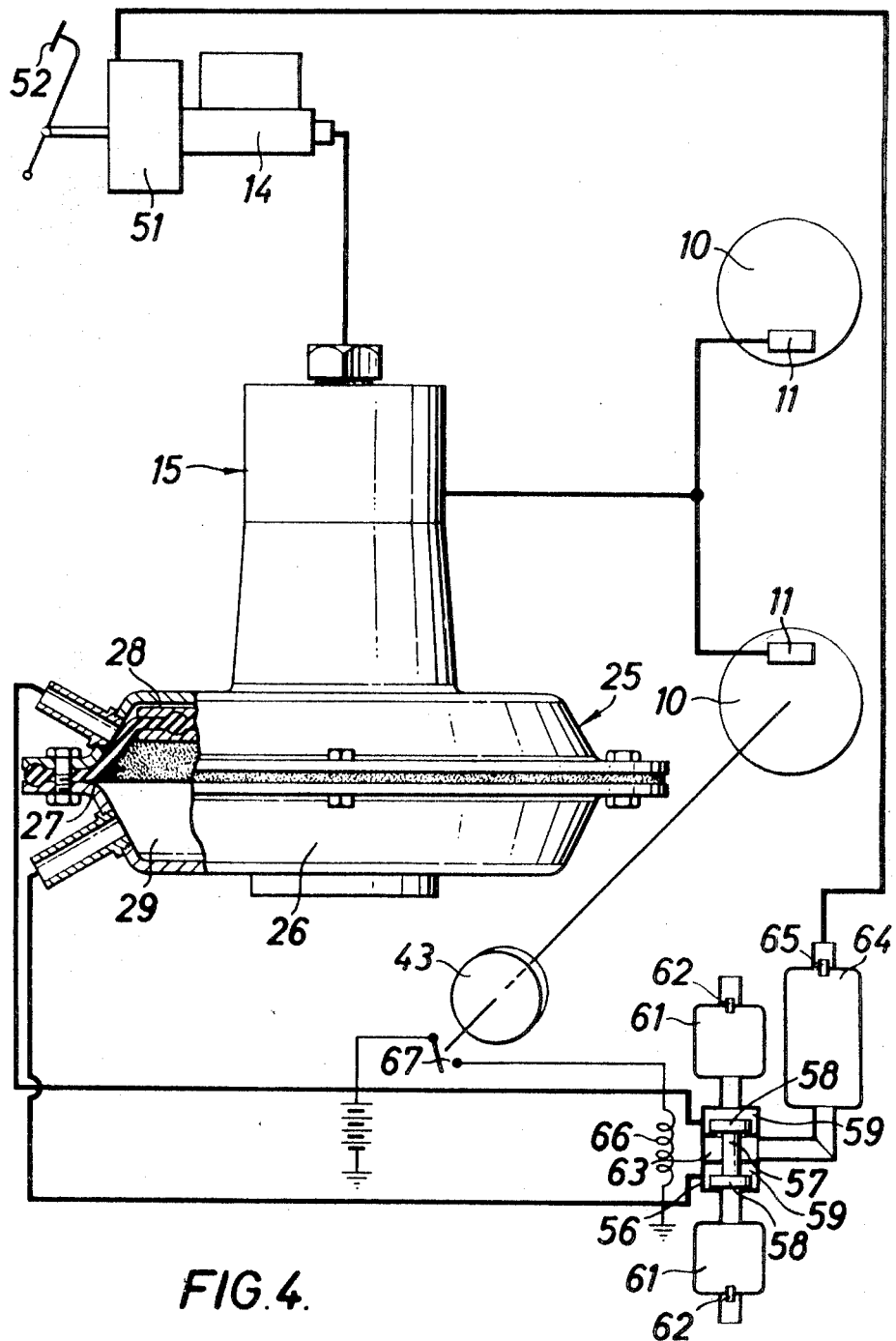
FIG. 4 shows a liquid pressure braking system according to the invention in which a single shuttle valve is provided.

The two shuttle valves 36 and 37 may, as shown in FIG. 4, be replaced by a single shuttle valve 56 the spool member 57 of which has two heads 58 each located in one end chamber 59 of the valve body, ports at the outer ends of the chambers 59 being connected through fixed volume chambers 61 and flow restricting devices 62 to the source of lower pressure. A central chamber 63 in the valve body connected by ports to the inner ends of the chambers 59, is connected through a fixed-volume chamber 64 and a flow-restricting device 65 to the working chamber of an air booster 51 acting on the piston of the master cylinder 14. When either one of the spool heads 58 is in a position to close the port in one chamber 59 leading to the source of lower pressure, the other spool head is in a position to close the port leading to the other chamber 59 from the booster working chamber.

The spool member 57 is normally urged, for example by a spring (not shown) to the position shown in FIG. 4, in which the chamber 29 of the servo device is connected to the booster working chamber and the chamber 28 is connected to the lower pressure source. The said spool member is moved to its opposite position, when the skid-sensing device 43 operates, by a solenoid 66 energized by the closing of contacts 67 by the said sensing device.

Figure 5:
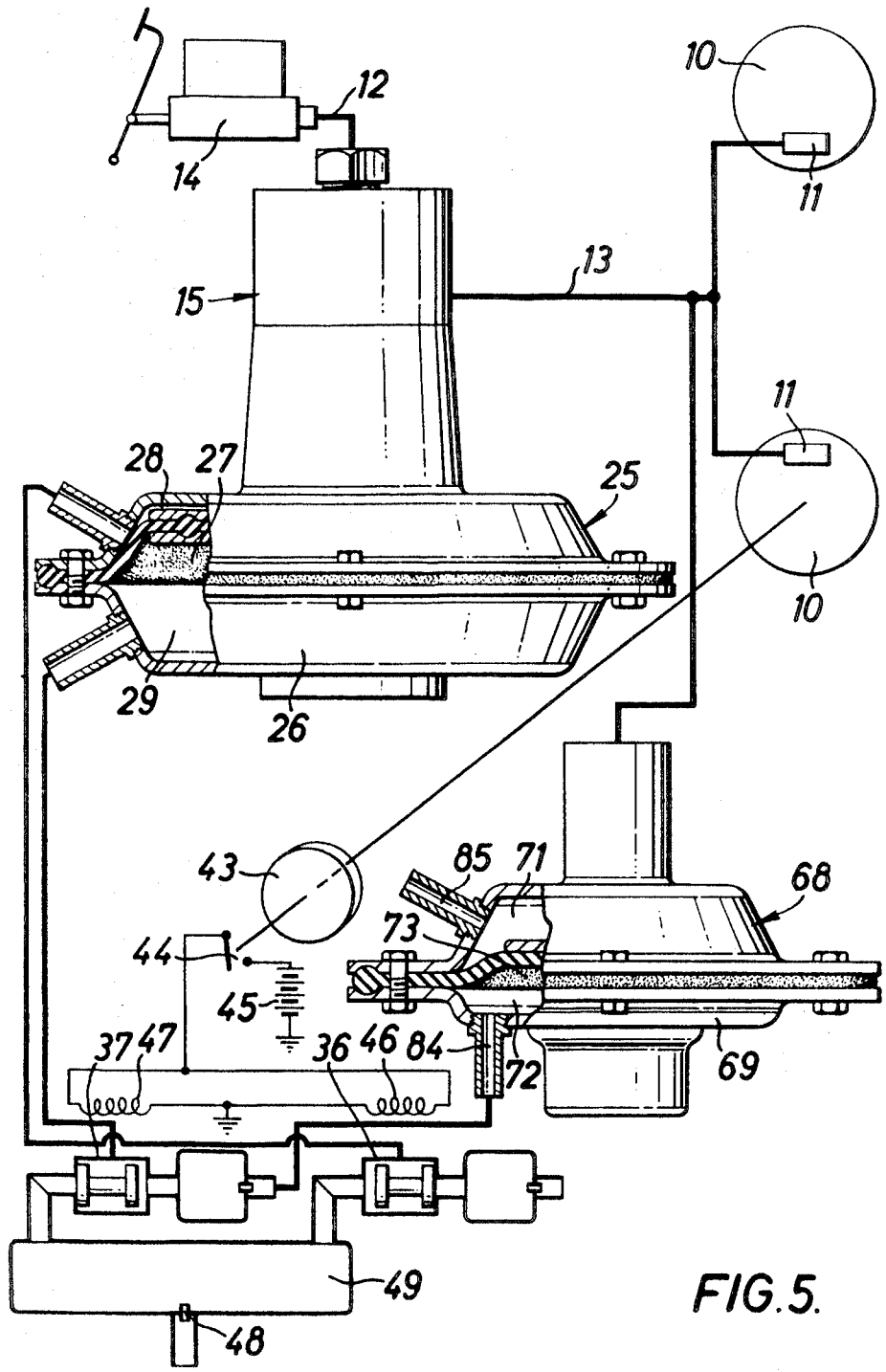
FIG. 5 shows a liquid pressure braking system according to the invention in which the pressure on one side of the movable wall of the servo device is variable in accordance with the liquid pressure acting in the brake motor cylinder.

The pressure acting on the diaphragm 27 in the second servo chamber 29 may be caused to vary with the liquid pressure in the braking system by means directly controlled by the said liquid pressure, preferably the liquid pressure existing between the valve ball 19 and the brake-operating motor cylinders 11. Referring to FIG. 5, the lower pressure source connected to the spool valve 37 associated with that chamber 29 is a vacuum source connected to that spool valve 37 and to the other spool valve 36 through a common contact volume chamber 49 and flow-restricting device 48. The higher pressure source is the atmosphere, but the actual pressure received from the said higher pressure source by the chamber 29 is modified in accordance with the liquid pressure in the braking system by a pressure control device 68 shown in detail, and described with reference to, FIG. 6. The said pressure control device is, as shown in FIG. 5 connected to the conduit 13 leading from the valve housing 15 to the motor cylinders 11.

Figure 6:
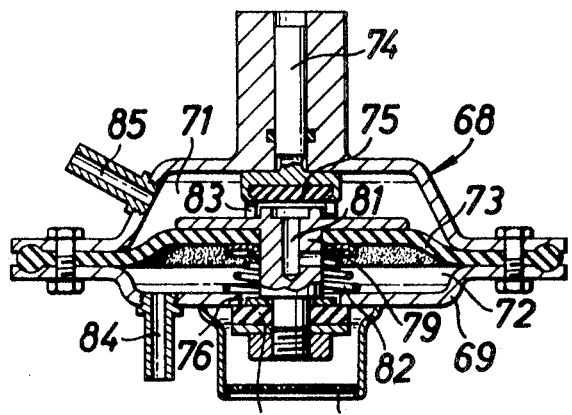
FIG. 6 is a sectional elevation, of a valve included in the braking system of FIG. 5.

The pressure control device 68, as shown in FIG. 6 comprises a housing 69 divided into two chambers 71 and 72 by a flexible diaphragm 73. A plunger 74 extending into the chamber 71 carries a valve seat 75 in the said chamber, the other end of the plunger 74 being subjected to the pressure existing in the part of the liquid pressure braking system between the valve ball 19 and the motor cylinders 11. An aperture 76 in the wall of the other chamber 72, connected to the atmosphere through an air filter 77, is closed by a valve member 78. A stem 79 mounted in the center of the diaphragm 73 and having formed in it a passage 81 connecting the two chambers 71 and 72 cooperates at one end with the valve seat 75 to control the said passage 81 and carries the valve member 78 closing the aperture 76 at its other end, a spring 82 being provided to urge the said valve member 78 to a seated position. A washerlike spring 83 having a wavy form is interposed between the valve seat 75 on the plunger 74 and the diaphragm 73, the spring 83 tending to hold the valve seat 75 away from the adjacent end of the stem 79. The chamber 72 is also connected at 84 to the spool valve 37 associated with the second servo chamber 29 so as to be connected to the said chamber 28 under normal conditions, and the other chamber 71 of the pressure control device is connected at 85 to a vacuum source.

When no braking is taking place, the second servo chamber 29 is connected to vacuum through the pressure control device 68 and spool valve 37. When the brakes are applied, the liquid pressure in the braking system moves the plunger 74 of the pressure control device 68, shuts off the vacuum connection 85 from the spool valve 37 and opens the air connection 84 thereto so that pressure is applied to the said second servo chamber 29, the pressure building up until, acting on the diaphragm 73 of the pressure control device 68, it balances the liquid pressure acting on the plunger 74 and closes the atmospheric connection 84. The pressure opposing the closing of the valve ball 19 thus varies with the liquid pressure exerted to apply the brakes. If the skid-sensing device operates, the spool valves 36 and 37 associated with both the servo chambers change over, and vacuum is applied to the second servo chamber 29 as already described. If the brakes have been only lightly applied, the pressure in the second servo chamber 29 will not have risen to a great extent, and the response of the device will be more rapid than it would if the pressure in the second servo chamber 29 built up to a value sufficient to support the volume-increasing plunger 22 against the maximum pressure which could be built up in the said second servo chamber 29 under heavy braking.

We claim:

1. An antilock means for a liquid pressure braking system comprising a servo device with movable diaphragm means therein dividing it into a first chamber and a second chamber, valve means in said servo device normally held in an open position to connect a brake cylinder to a source of fluid pressure until a tendency to skid is sensed, first conduit means normally connecting said first chamber to a source of low fluid pressure to maintain said first chamber at a minimum volume, second conduit means normally connecting said second chamber to a source of high-pressure fluid to maintain said second chamber at a maximum volume, a valve plunger in said servo device in contact with said movable diaphragm means to keep said valve means open when said second chamber is connected to said high-pressure fluid source, other valve means connecting said first conduit means and said first chamber to a source of high-pressure fluid and connecting said second conduit means and second chamber to a source of low fluid pressure source, said other valve means normally being disposed to maintain a fluid pressure differential across said movable diaphragm means in a direction to hold said valve means open by said plunger, and a skid-sensing device operatively connected to said other valve means to reverse the normal connections of said first and second chambers with said high and low fluid pressure sources respectively and to connect said first chamber with the high source of fluid pressure and to connect said second chamber with said low fluid pressure source to close said valve means and cut off communication of said brake cylinder with its source of fluid pressure until said wheel stops its skid, and means are provided whereby the pressure in at least one of said chambers of said servo device resulting from the action of the sensing device varies with the pressure exerted in the braking system by the liquid pressure source thereof.

2. A liquid pressure braking system according to claim 1 wherein the source of higher fluid pressure is the working chamber of an air servo device providing thrust to actuate a master cylinder constituting the liquid pressure source of the braking system.

3. A liquid pressure braking system according to claim 1 wherein said second chamber of the servo device in which the higher fluid pressure acts when the valve means controlling the connections of the said chambers to the higher and lower pressure sources are in their normal positions is adapted to be connected through the associated spool valve to the higher fluid pressure source through a pressure control device which controls the pressure acting in said chamber in accordance with the liquid pressure in the braking system.

4. A liquid pressure braking system according to claim 3 wherein the pressure control device is responsive to the liquid pressure in the braking system between the normally open valve and the motor cylinder.